United States Patent
Liu et al.

(10) Patent No.: US 8,516,104 B1
(45) Date of Patent: Aug. 20, 2013

(54) METHOD AND APPARATUS FOR DETECTING ANOMALIES IN AGGREGATED TRAFFIC VOLUME DATA

(75) Inventors: Danielle Liu, Morganville, NJ (US); Chaim Spielman, Spring Valley, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1385 days.

(21) Appl. No.: 11/316,272

(22) Filed: Dec. 22, 2005

(51) Int. Cl.
*G06F 15/173* (2006.01)
(52) U.S. Cl.
USPC ............ 709/224; 709/223; 709/204; 379/133
(58) Field of Classification Search
USPC ................................................ 709/223–224
See application file for complete search history.

(56) References Cited

U.S. PATENT DOCUMENTS

| | | | | |
|---|---|---|---|---|
| 5,594,748 A * | 1/1997 | Jabr | | 372/38.09 |
| 6,597,777 B1 * | 7/2003 | Ho | | 379/133 |
| 6,871,183 B2 * | 3/2005 | Gilday et al. | | 705/10 |
| 7,107,339 B1 * | 9/2006 | Wolters | | 709/224 |
| 7,672,814 B1 * | 3/2010 | Raanan et al. | | 702/193 |

* cited by examiner

*Primary Examiner* — Hua Fan

(57) ABSTRACT

Method and apparatus for processing traffic of interest in a network is described. In one example, a baseline profile and at least one threshold is computed using initial aggregated volume data for the traffic of interest. Aggregated volume counts for time periods in a time interval are obtained. Differences between the aggregated volume counts for the time periods and values of the baseline profile for corresponding time periods are computed. An alarm is triggered for each of the differences that exceeds the at least one threshold.

14 Claims, 4 Drawing Sheets

METHOD AND APPARATUS FOR DETECTING ANOMALIES IN AGGREGATED TRAFFIC VOLUME DATA

BACKGROUND OF THE INVENTION

1. Field of the Invention

Embodiments of the present invention generally relate to traffic monitoring in a network and, more particularly, to a method and apparatus for detecting anomalies in aggregated traffic volume data.

2. Description of the Related Art

Networks typically monitor data traffic passing through one or more network elements in order to detect abnormal activities that may suggest some type of malicious attack is underway. One type of traffic alarm process relies on a complex frequency domain analysis of traffic volume. Other types of traffic alarm processes employ static thresholds for alarming based on traffic volume. However, Internet traffic is complex and difficult to characterize and model. The aggregated traffic is a mixture of difference applications and protocols. The traffic is evolving as the applications and protocols change. Any alarm process that uses static thresholds is only effective for a short period of time, since the traffic is dynamic and under constant change. Accordingly, there exists a need in the art for a method and apparatus for detecting anomalies in aggregated traffic volume data that can accurately detect abnormal changes in traffic and is less complex.

SUMMARY OF THE INVENTION

Method and apparatus for processing traffic of interest in a network is described. In one embodiment, a baseline profile and at least one threshold is computed using initial aggregated volume data for the traffic of interest. Aggregated volume counts for time periods in a time interval are obtained. Differences between the aggregated volume counts for the time periods and values of the baseline profile for corresponding time periods are computed. An alarm is triggered for each of the differences that exceeds the at least one threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
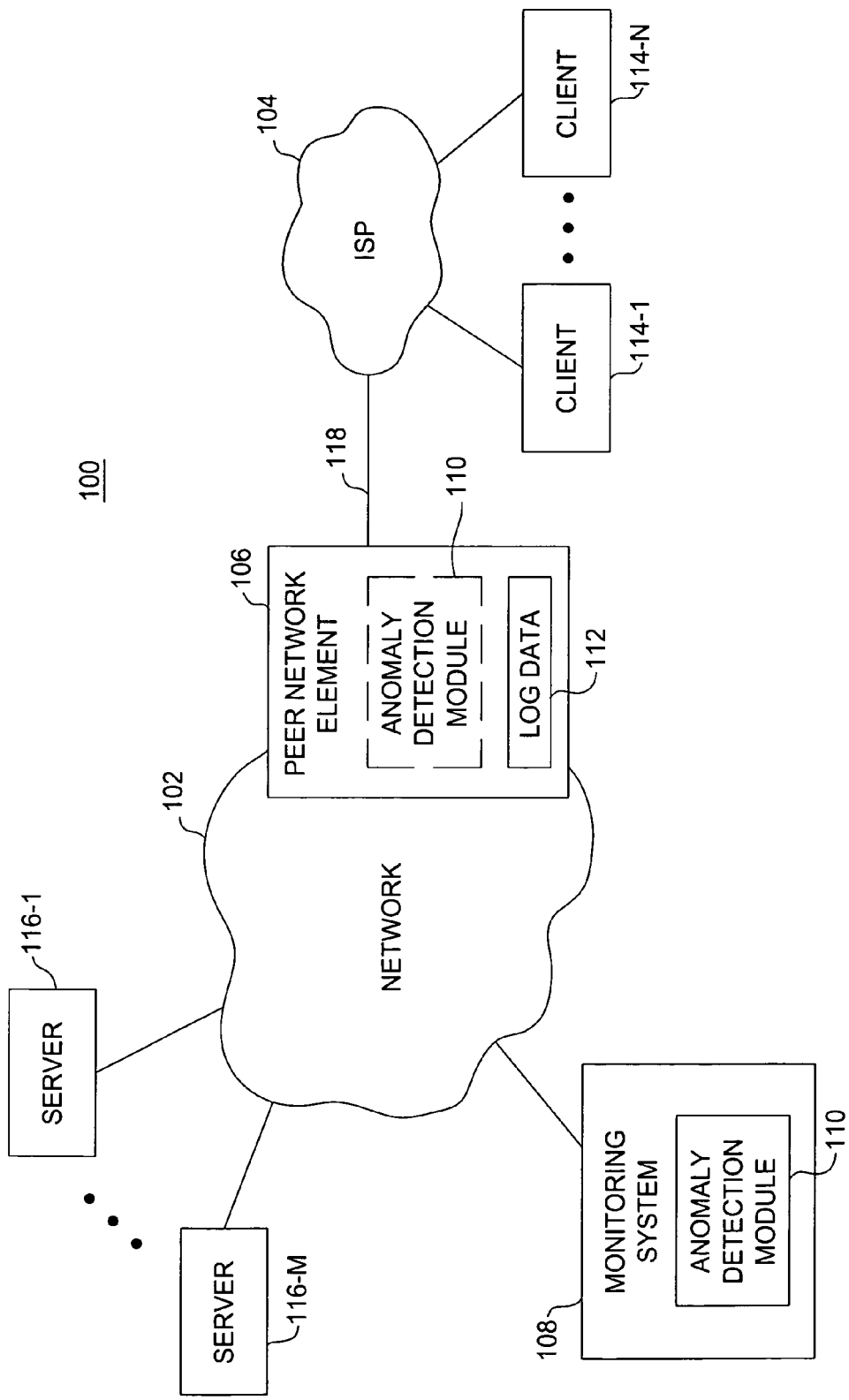
FIG. 1 is a block diagram depicting a network architecture in accordance with one or more aspects of the invention.

FIG. 1 is a block diagram depicting a network architecture 100 in accordance with one or more aspects of the invention. The network architecture 100 includes a network 102 in communication with a network 104 via a peering connection 118. Each of the networks 102 and 104 comprise packet networks configured to propagate packets in accordance with a particular network protocol, such as internet protocol (IP), and transport protocol, such as transmission control protocol (TCP). In the present example, the network 104 comprises an Internet Service Provider (ISP) network. The network 102 includes a peer network element 106 for receiving traffic from the ISP 104 over the peer connection 118 and providing traffic to the ISP 104 over the peer connection 118. The peer network element 106 may comprise one or more routers, switches, and the like.

In a typical peering arrangement, the network 102 and the ISP 104 forward each others packets directly across the peering connection 118, rather than using the standard Internet backbone. For example, the ISP 104 may provide Internet service to the clients 114-1 through 114-N (collectively clients 114). The network 102 may host servers 116-1 through 116-M (collectively servers 116). If the clients 114 request access to services hosted by the servers 116, the corresponding packets are communicated between the ISP 104 and the network 102 directly over the peering connection 118.

The peer network element 106 is configured to log various statistics with respect to the traffic communicated over the peer connection 118. In particular, the peer network element 106 is configured to record volumetric counts of flows, packets, and/or bytes passing over the peer connection 118. In one embodiment, a monitoring system 108 is coupled to the network. The monitoring system 108 includes an anomaly detection module 110 for detecting abnormal volume changes for traffic of interest through the peer network element 106. The monitoring system 108 is configured to periodically collect volume data for traffic of interest from the peer network element 106. The anomaly detection module 110 executes an algorithm using the volume data as parametric input. As described in more detail below, when there is a significant volume change in traffic of interest, the algorithm determines based on past data observations if the change can be attributed to normal traffic fluctuation or abnormal activities. Detection of abnormal volume changes may suggest some type of attack is underway. If such abnormal volume is detected, the anomaly detection module 110 generates an alarm.

In another embodiment, the anomaly detection module 110 is implemented by the peer network element 106. Alarms generated by the anomaly detection module 110 are detected by the monitoring system 108. Those skilled in the art will appreciate that the network architecture 100 is just one example of a network architecture in which the present invention may be employed. In general, the anomaly detection module 110 may be employed to monitor volume for traffic of interest through any network element in a network.

In particular, aggregated traffic volume data often exhibits daily and weekly periodicity as a function of time. The algorithm operates on the assumption that the traffic pattern for a current week is similar to the pattern observed in the past weeks. Assume an aggregated volumetric count of traffic is obtained for N time periods every week. Let $X_{n,j}$ be the aggregated traffic value for an nth week and jth time period, where $n \geq 0$ and $1 \leq j \leq N$. Let $B_{n,j}$ be a weekly baseline profile value for the nth week and jth time period, where $n \geq 0$ and $1 \leq j \leq N$. The weekly baseline profile is established from N data points using exponential smoothing. The baseline profile value for the (n+1)th week is obtained by the following:

$$B_{n+1,j} = X_{n,j}\alpha + B_{n,j}(1-\alpha) \qquad \text{Eq. 1,}$$

where $\alpha$ is an exponential smoothing constant. The initial baseline profile is formed as follows (where M is the number of points used for exponential smoothing):

$$B_{1,j} = \frac{X_{1,j-M+1} + X_{1,j-M+2} + \ldots + X_{1,j}}{M} \text{ for } M \leq j \leq N \quad \text{Eq. 2}$$

with $$B_{1,1} = X_{1,1} \text{ and } B_{1,2} = \frac{X_{1,1} + X_{1,2}}{2}, \ldots,$$

$$B_{1,M} = \frac{X_{1,1} + X_{1,2} + \ldots + X_{1,M}}{M}.$$

The difference of the jth observed value ($X_{n,j}$) and the jth baseline value for the nth week is defined as:

$$D_j = X_{n,j} - B_{n,j} \quad \text{Eq. 3.}$$

The difference, $D_j$, can be empirically shown to be normally distributed with a mean of zero. A variance is updated weekly by applying exponential smoothing over the estimated variance for the past week. The variance for the nth week ($S_n$) is defined as follows:

$$S_n = (1-\beta)S_{n-1} + \beta \frac{\sum_{j=1}^{N}(X_{n,j} - B_{n,j})^2 \text{ when } |X_{n,j} - B_{n,j}| < D_{\text{cutoff}}, 0 \text{ otherwise}}{N - n_{\text{cutoff}} - n_{\text{missing}} - 1}, \quad \text{Eq. 4}$$

where $\beta$ is an exponential smoothing constant and the initial condition is defined as:

$$S_1 = \frac{\sum_{j=1}^{N}(X_{1,j} - B_{1,j})^2}{N-1} \times \frac{M}{M-1}. \quad \text{Eq. 5}$$

When $X_{n,j}=0$, $X_{n,j}$ is assigned the value $B_{n,j}$. Notably, the outliers are excluded in estimating the variance. The variable $n_{\text{cutoff}}$ is the number of outliers seen in the nth week and $n_{\text{missing}}$ is the number of missing data points in the nth week.

In one embodiment, when $n_{\text{cutoff}} > N/2$, the baseline profile is re-computed rather than updated. If half the data points are abnormal, then there might be some fundamental change in the data to which the algorithm needs to adapt. The baseline profile is re-computed in the same manner as the baseline profile is initialized. Essentially, the current week's data is used to build a new baseline and ignore all the historical data. Thresholds for triggering alarms for the (n+1)st week are determined from $k\sqrt{S_n}$ (Eq. 7), where k is greater than three. Multiple thresholds correspond to different threat levels by varying k. $D_{\text{cutoff}}$ is used to determine if the data point is discarded as an outlier. $D_{\text{cutoff}}$ may be smaller than the threshold. For example, $D_{\text{cutoff}}$ may be equal to $k_1\sqrt{S_n}$ and the threshold may be equal to $k_2\sqrt{S_n}$, where $k_1 < k_2$.

Figure 2:
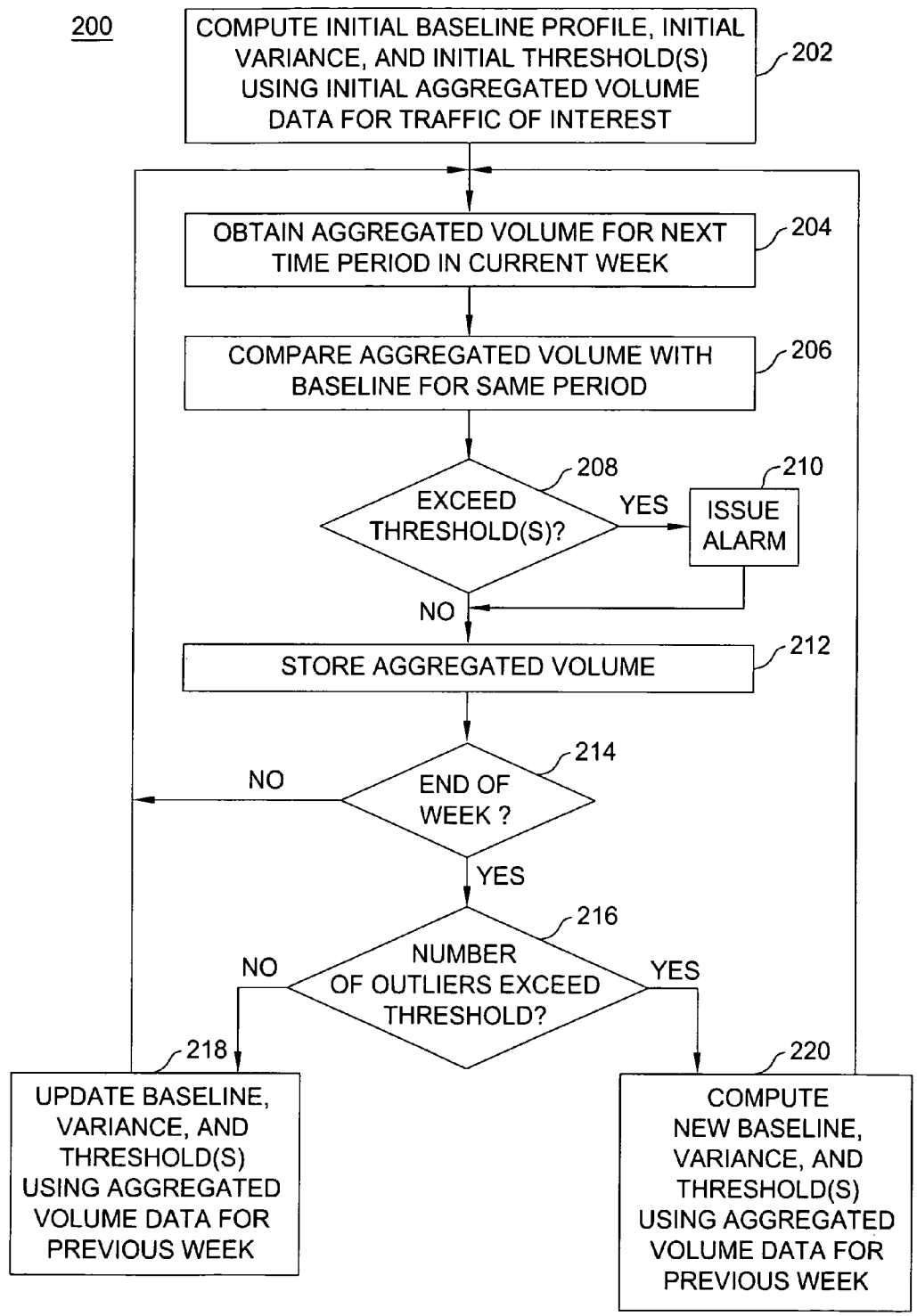
FIG. 2 is a flow diagram depicting an exemplary embodiment of a method for detecting anomalies in aggregated volume counts for traffic of interest in accordance with one or more aspects of the invention.

FIG. 2 is a flow diagram depicting an exemplary embodiment of a method 200 for detecting anomalies in aggregated volume counts for traffic of interest in accordance with one or more aspects of the invention. The traffic of interest may be traffic flows, packets, or bytes received or transmitted over a connection. The traffic of interest may be limited to a particular application associated with the traffic, such traffic associated with different IP ports (e.g., port 80 for hypertext transfer protocol (HTTP)). The method 200 may be performed by the anomaly detection module 110. Notably, the anomaly detection module 110 may execute the method 200 for each of a plurality of different types of traffic of interest.

The method 200 begins at step 202, where an initial baseline profile, an initial variance, and one or more initial thresholds are computed using initial aggregated volume data for the traffic of interest. The initial baseline profile is obtained using a moving average of the initial aggregated volume data for a particular week. The initial baseline profile may be computed using Equation 2 and the initial variance may be computed using Equation 5. The initial threshold(s) are computed from the initial variance using Equation 7. The initial aggregated volume data should be for a clean week (e.g., a week without any major security events or holidays). At step 204, an aggregated volume count is obtained for the next time period in the current week. As discussed above, the current week is divided into a series of time periods. In one embodiment, a time period comprises an hour, yielding 7*24=168 time periods and thus 168 aggregated volume counts are obtained per week. Those skilled in the art will appreciate that other durations may be used for the time periods instead of hours.

At step 206, the aggregated volume count is compared with a baseline profile value for the same period. For example, the difference shown in Equation 3 is computed and compared to one or more thresholds. At step 208, a determination is made whether a difference exceeds any threshold. If so, the method 200 proceeds to step 210, where an alarm is issued. The alarm may indicate which threshold has been exceeded (e.g., multiple thresholds may be defined in accordance with multiple severity levels). The method 200 proceeds from step 210 to step 212. If the difference does not exceed any threshold at step 208, the method 200 proceeds to step 212, where the aggregated volume count for this period is stored. Notably, if the aggregated volume count triggered an alarm, then the aggregated volume count is flagged. As discussed above, missing data and alarmed data points are disregarded in the variance/threshold updates.

At step 214, a determination is made whether the week has ended. The week ends when the aggregated volume count has been obtained for the last period in the week. If the week has not ended, the method 200 returns to step 204 and repeats for the next time period in the current week. If the week has ended at step 214, the method 200 proceeds to step 216. At step 216, a determination is made whether a number of outliers in the stored aggregated volume data for the previous week exceeds a threshold. For example, as discussed above, if half of the aggregated volume counts are abnormal, then there might be some fundamental change in the data to which the algorithm needs to adapt.

If the number of outliers does not exceed the threshold, the method 200 proceeds to step 218. At step 218, the baseline profile, the variance, and the threshold(s) are updated using the stored aggregated volume data for the previous week. The baseline profile may be updated using Equation 1. The variance may be updated using Equation 4. The new threshold(s) may be computed using Equation 7. The method 200 then returns to step 204 and repeats for the next week. If the number of outliers exceeds the threshold at step 216, the method 200 proceeds to step 220. At step 220, a new baseline, a new variance, and new threshold(s) are computed using the stored aggregated volume data for the previous week. The new baseline, new variance, and new threshold(s) may be computed in the same manner as the initial baseline, initial variance, and initial threshold(s) are computed at step 202. The method 200 then returns to step 204 and repeats for the next week.

For purposes of clarity by example, the baseline profile is computed on a weekly basis. Those skilled in the art will appreciate that the baseline profile may be computed using time intervals of any duration. In general, each time interval includes a series of time periods during which aggregated volume counts are obtained. Baseline profiles, variances, and threshold(s) are updated or recomputed upon the end of the time inverval.

Figure 3:
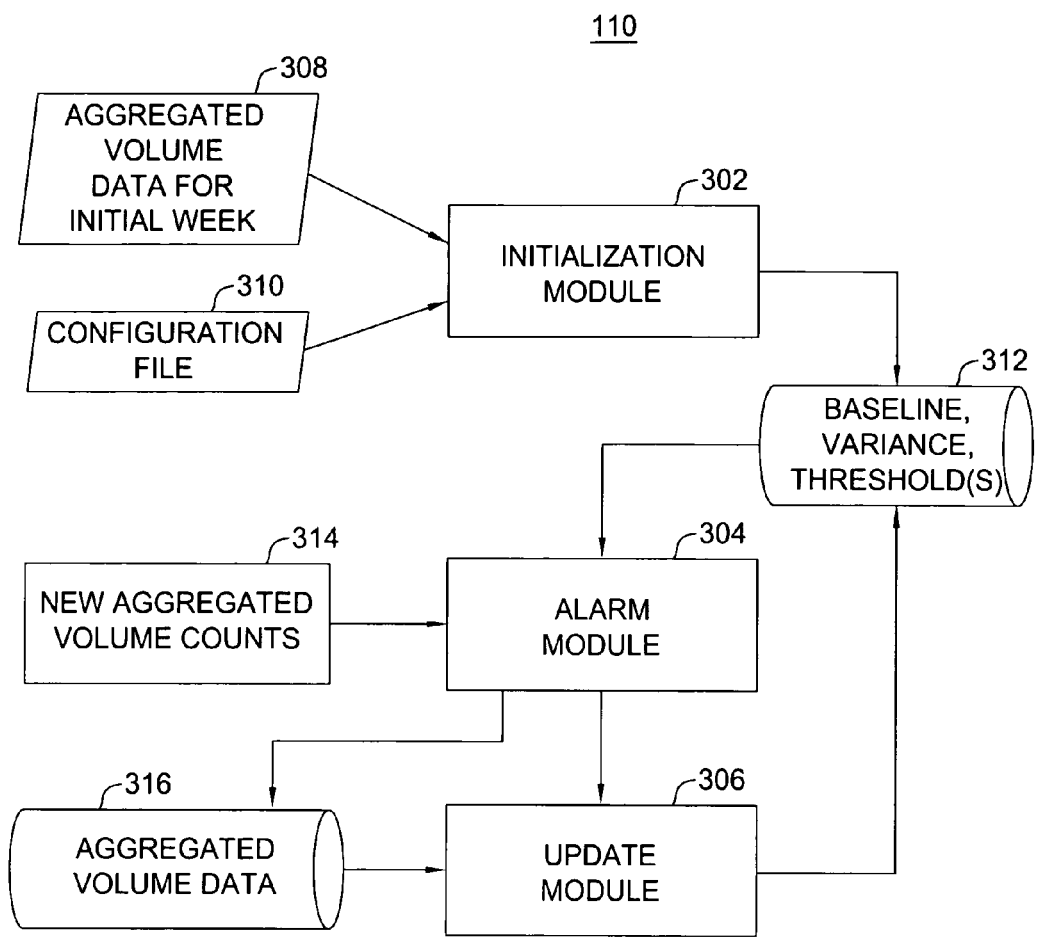
FIG. 3 is a block diagram depicting an exemplary embodiment of an anomaly detection module in accordance with one or more aspects of the invention.

FIG. 3 is a block diagram depicting an exemplary embodiment of the anomaly detection module 110 in accordance with one or more aspects of the invention. The anomaly detection module 110 includes an initialization module 302, an alarm module 203, and an update module 306. The initialization module 302 is configured to receive aggregated volume data for an initial week (data 308) and a configuration file 310. The configuration file 310 includes a parameter list for each type of traffic of interest. For example, an entry in the configuration file 310 may include fields for type of traffic, the exponential smoothing constant for the baseline update ($\alpha$), the exponential smoothing constant for the variance update ($\beta$), and one or more values for indicating the severity of an exceeded threshold. The configuration file 310 may include multiple entries for multiple types of traffic to monitor. The data 308 may include aggregated volume data for multiple types of traffic. The initialization module 302 determines an initial baseline profile, an initial variance, and initial threshold(s) for each entry in the configuration file. The initial results are stored in a database 312.

The alarm module 304 is configured to receive new aggregated volume counts periodically (data 314) and baseline and threshold data from the database 312. For each type of traffic being monitored, the alarm module 304 compares a current aggregated volume count with a baseline profile value for the same period last week and triggers an alarm if the difference exceeds any of the thresholds. The alarm module 304 is configured to store the aggregated volume counts in a database 316. The alarm module 304 is configured to provide an indication to the update module 306 when last period of the week has been processed.

The update module 306 is configured to receive aggregated volume data for the previous week from a database 316. For each type of traffic being monitored, the update module 306 updates the baseline profile, the variance, and the threshold(s) using the data from the database 316. The update module 306 is also configured to re-compute a particular baseline and associated variance and threshold(s) if a certain number of alarms are triggered during the previous week.

Figure 4:
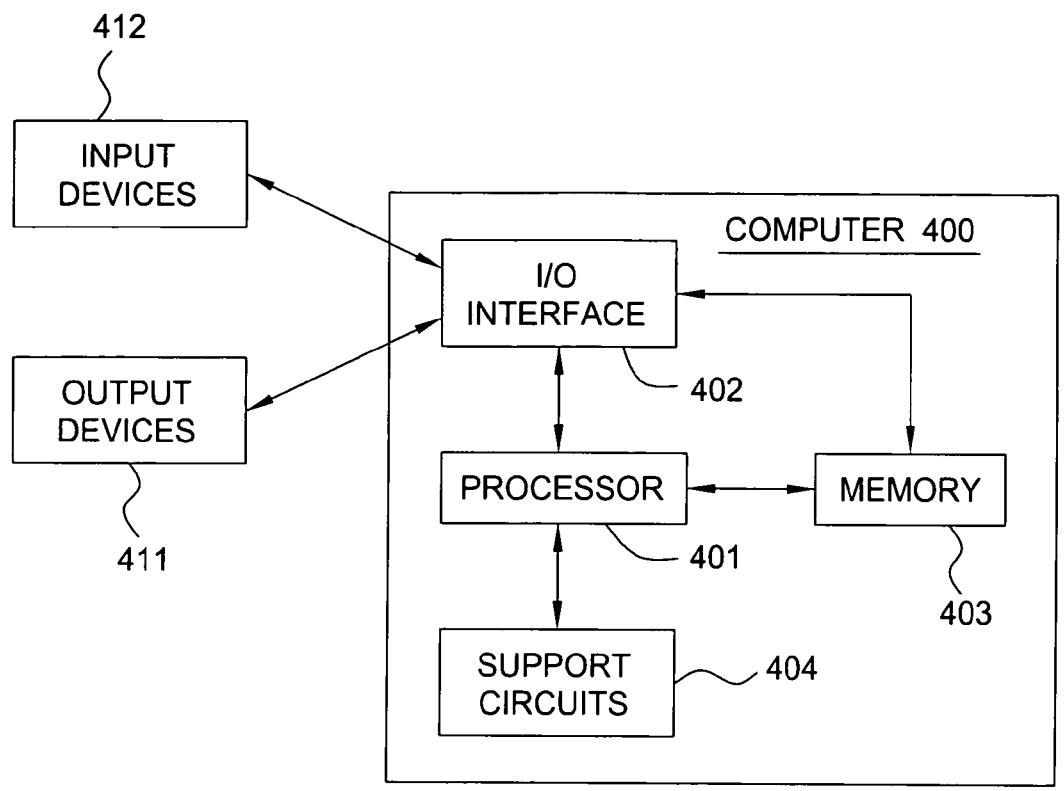
FIG. 4 is a block diagram depicting an exemplary embodiment of a computer configured to implement the processes and methods described herein.

FIG. 4 is a block diagram depicting an exemplary embodiment of a computer 400 configured to implement the processes and methods described herein. The computer 400 may be used to implement the anomaly detection module 110 and perform the method 200. The computer 400 includes a processor 401, a memory 403, various support circuits 404, and an I/O interface 402. The processor 401 may be any type processing element known in the art, such as microprocessor. The support circuits 404 for the processor 401 include conventional cache, power supplies, clock circuits, data registers, I/O interfaces, and the like. The I/O interface 402 may be directly coupled to the memory 403 or coupled through the processor 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the processor 401 for performing the method 200 of FIG. 2 and implementing the anomaly detection module 110 of FIG. 3. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of processing traffic of interest in a network, comprising:

computing, for the traffic of interest, a baseline profile and a threshold using initial aggregated volume data of the traffic of interest, wherein the baseline profile is computed via a processor using exponential smoothing, wherein the aggregated volume data comprises volume data of network traffic passing through a plurality of network elements of the network aggregated over a time interval having a plurality of time periods;

obtaining, by the processor, an aggregated volume count for each particular time period of the plurality of time periods, wherein the aggregated volume count comprises a count of volume of traffic data for each particular period of the plurality of time periods, wherein the aggregated volume count is a count of the network traffic passing through the plurality of network elements of the network;

computing, by the processor, for each particular time period of the plurality of time periods, a difference between the aggregated volume count of the particular time period of the plurality of time periods and a particular value of the baseline profile for the same time period;

triggering, by the processor, an alarm for each difference that is computed and exceeds the threshold;

storing, by the processor, the aggregated volume counts for the plurality of time periods to re-define the aggregated volume data; and modifying, by the processor, the baseline profile and the threshold in accordance with the aggregated volume data being re-defined, wherein the modifying comprises:

comparing a number of outliers in the aggregated volume data to a second threshold;

updating the baseline profile and the threshold using the aggregated volume data if the number of outliers is less than the second threshold; and re-computing the baseline profile and the threshold using the aggregated volume data if the number of outliers exceeds the second threshold.

2. The method of claim 1, wherein the re-computing the baseline profile further comprises re-computing a variance, and updating the variance using the aggregated volume data while ignoring any outliers therein.

3. The method of claim 2, wherein the re-computing the variance and the updating the variance are performed using the exponential smoothing.

4. The method of claim 1, wherein the updating the baseline profile and the re-computing the baseline profile are performed using the exponential smoothing.

5. The method of claim 1, wherein a duration of the time interval comprises a week and a duration of each of the plurality of time periods comprises an hour.

6. An apparatus for processing traffic of interest in a network, comprising:

a hardware processor; and a tangible computer readable medium storing a plurality of instructions which, when executed by the hardware processor, cause the hardware processor to perform operations, the operations comprising:

computing, for the traffic of interest, a baseline profile and a threshold using initial aggregated volume data of the traffic of interest, wherein the baseline profile is computed using exponential smoothing, wherein the aggregated volume data comprises volume data of network traffic passing through a plurality of network elements of the network aggregated over a time interval having a plurality of time periods;

obtaining an aggregated volume count for each particular time period of the plurality of time periods, wherein the aggregated volume count comprises a count of volume of traffic data for each particular period of the plurality of time periods, wherein the aggregated volume count is a count of the network traffic passing through the plurality of network elements of the network;

computing, for each particular time period of the plurality of time periods, a difference between the aggregated volume count of the particular time period of the plurality of time periods and a particular value of the baseline profile for the same time period;

triggering an alarm for each difference that is computed and exceeds the threshold;

storing the aggregated volume counts for the plurality of time periods to re-define the aggregated volume data; and modifying the baseline profile and the threshold in accordance with the aggregated volume data being re-defined, wherein the modifying comprises:

comparing a number of outliers in the aggregated volume data to a second threshold;

updating the baseline profile and the threshold using the aggregated volume data if the number of outliers is less than the second threshold; and re-computing the baseline profile and the threshold using the aggregated volume data if the number of outliers exceeds the second threshold.

7. The apparatus of claim 6, wherein the re-computing the baseline profile further comprises re-computing a variance, and updating the variance using the aggregated volume data while ignoring any outliers therein.

8. The apparatus of claim 7, wherein the variance is re-computed and updated using the exponential smoothing.

9. The apparatus of claim 6, wherein the baseline profile is updated and re-computed using the exponential smoothing.

10. The apparatus of claim 6, wherein a duration of the time interval comprises a week and a duration of each of the plurality of time periods comprises an hour.

11. A non-transitory computer readable medium to store a plurality of instructions which, when executed by a hardware processor, cause the hardware processor to perform operations of processing traffic of interest in a network, the operations comprising:

computing, for the traffic of interest, a baseline profile and a threshold using initial aggregated volume data of the traffic of interest, wherein the baseline profile is computed using exponential smoothing, wherein the aggregated volume data comprises volume data of network traffic passing through a plurality of network elements of the network aggregated over a time interval having a plurality of time periods;

obtaining an aggregated volume count for each particular time period of the plurality of time periods, wherein the aggregated volume count comprises a count of volume of traffic data for each particular period of the plurality of time periods, wherein the aggregated volume count is a count of the network traffic passing through the plurality of network elements of the network;

computing, for each particular time period of the plurality of time periods, a difference between the aggregated volume count of the particular time period of the plurality of time periods and a particular value of the baseline profile for the same time period;

triggering an alarm for each difference that is computed and exceeds the threshold;

storing the aggregated volume counts for the plurality of time periods to re-define the aggregated volume data; and modifying the baseline profile and the threshold in accordance with the aggregated volume data being re-defined, wherein the modifying comprises:

comparing a number of outliers in the aggregated volume data to a second threshold;

updating the baseline profile and the threshold using the aggregated volume data if the number of outliers is less than the second threshold; and re-computing the baseline profile and the threshold using the aggregated volume data if the number of outliers exceeds the second threshold.

12. The non-transitory computer readable medium of claim 11, wherein the re-computing the baseline profile further comprises re-computing a variance, and updating the variance using the aggregated volume data while ignoring any outliers therein.

13. The non-transitory computer readable medium of claim 12, wherein the re-computing the variance and the updating the variance are performed using the exponential smoothing.

14. The non-transitory computer readable medium of claim 11, wherein the updating the baseline profile and the re-computing the baseline profile are performed using the exponential smoothing.

* * * * *